March 25, 1969 E. F. BRADLEY 3,435,310

ELECTRONIC HIGH SPEED STRIP RECORD ACCESSING CONTROL CIRCUITRY

Filed Dec. 22, 1966

*INVENTOR.*
EDWARD F. BRADLEY

BY [signature]

ATTORNEY

3,435,310
ELECTRONIC HIGH SPEED STRIP RECORD ACCESSING CONTROL CIRCUITRY

Edward Franklin Bradley, San Jose, Calif., assignor to International Business Machines Corporation, Armonk, N.Y., a corporation of New York Filed Dec. 22, 1966, Ser. No. 603,967
Int. Cl. H02p 5/46
U.S. Cl. 318—18 10 Claims

ABSTRACT OF THE DISCLOSURE

A strip record (magnetic tape) is transported at variable speed by a motor powered in response to prerecorded data on the record. The number of steps the record is to be incremented is entered in a difference-address register to which driving pulses are also applied for decrementing the number to zero at which time the record is stepped and held in position or transported at a data reproducing speed. An electronic tachometer, delivering energy levels indicative of predetermined rates, is connected to decelerating control and AND gates also connected to the lower order stages of the register. The final register stage, indicative of zero count, is connected to drive control logic circuitry for stopping and/or holding the record on the final increment after the device is slowed in response to the successive opening of the AND gates and subsequent switching of the driving means to the decelerating mode.

Figure 1:
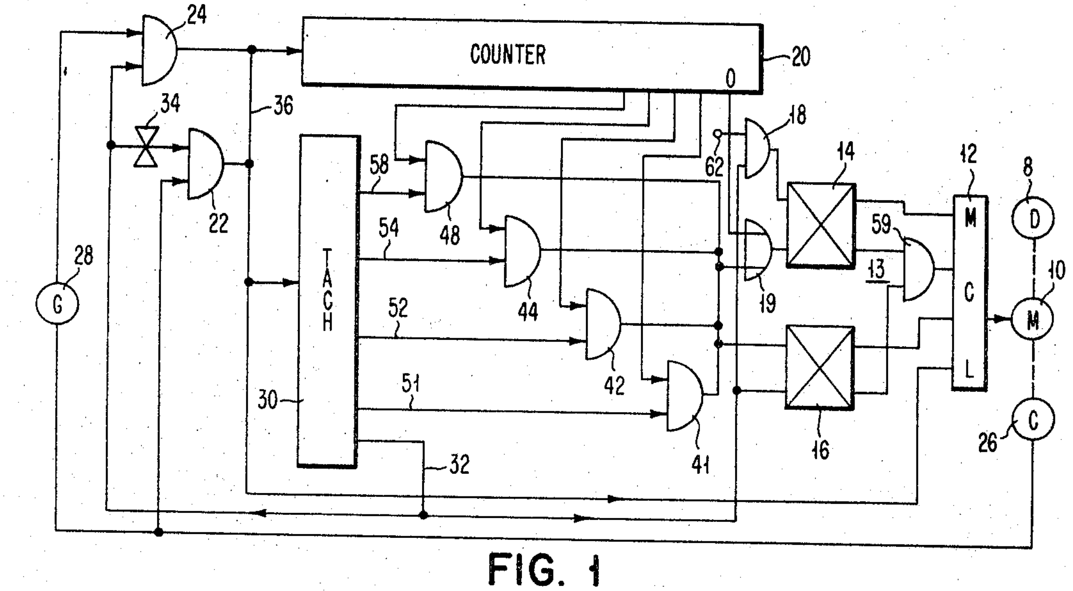

This application claims embodiments of the circuitry disclosed and generically claimed in the copending U.S. patent application Ser. No. 603,996 of Edward Franklin Bradley and Herman Anthony Ferrier, Jr., assigned to the IBM Corporation, filed on December 22, 1966 for "Electronic High Speed Device Incrementing Control Circuitry." The invention is particularly applicable to the control of electromechanical structures such as that disclosed in the copending U.S. patent application Ser. No. 564,190 of Ronald Duane Irvin, assigned to the IBM Corporation, filed on the July 11, 1966, for "Strip Record Medium Transporting Apparatus," thereafter issued on January 16, 1968, as U.S. Patent 3,363,853.

The invention relates to circuitry for controlling the incrementing of high speed strip record medium apparatus with particular emphasis on decelerating and halting the same precisely at the close of a predetermined increment. While the invention is particularly adaptable to closed-loop magnetic tape transporting servosystems comprising variable speed electric motors and/or drives, and the like, it is not necessarily limited to such arrangements as will be evident to those skilled in the art on studying the switched feedback control technique of the invention.

Digital electronic incrementing circuit arrangements are known in the art. Examples of such arrangements of the type to which the invention is directed are found in U.S. Patents: 2,121,061, June 1938, Townsend, 40—53; 2,979,972, April 1961, Danly, 74—821; 3,139,570, June 1964, Jacobson et al., 318—28; 3,206,665, September 1965, Burlingham, 318—312. The arrangements disclosed in the above mentioned art perform very well but require complicated circuitry for decelerating and stopping with precision at the close of a predetermined increment.

According to the invention, the objects indirectly referred to hereinbefore and which will appear as the specification progresses are attained in closed-loop incrementing servocircuit arrangements incorporating a switched feedback network for controlling an electric motor driven variable speed strip record medium driving arrangement.

The strip record medium to be incremented a number of steps is transported at a variable speed by one or more motors, powered through electric motor control logic for the particular motor having a drive control logic circuitry as part of the motor control logic for both holding the variable speed motor and/or for driving it in forward and/or reverse directions, in response to pulses obtained from prerecorded indicia or other data on the strip record medium as it is incremented. The number of steps over which the medium is to be incremented is entered into a multiple stage difference-address, or delta, register to which the driving pulse train is also applied for decrementing the number to zero at which time the medium is to be stopped and held in position or transported at a data reproducing speed as required. An electronic tachometer is coupled to the driving pulse source. The tachometer has a plurality of output terminals each capable of delivering an energy level indicative of a predetermined rate within the range of the tachometer. Some tachometers are arranged so that only one output terminal will deliver the corresponding energy level at any one time. Others will deliver energy back in number proportional to the rate. The output terminals of the tachometer are connected to decelerating control logic circuitry comprising individual AND gating circuits to which the lower order stages of the delta register are also connected in descending order corresponding to the descending speed levels of the tachometer. The final stage of the delta register, which provides an indication of zero count, is connected directly to the drive control logic circuitry for stopping and/or holding the medium precisely on the close of the predetermined final increment after the movement of the device is slowed in response to the successive opening of the AND gating circuits and subsequent switching of the driving means to the decelerating mode. Conventional variable speed motors, including stepping motors capable of both fundamental mode and superspeed mode operation, are readily adapted to the invention. Alternately, constant speed driving motors may be used with mechanical arrangements for moving the driven device at different speeds in accordance with displacement of mechanical parts under the control of electric control elements, and electro-mechanical converters, for example, solenoids and/or switches.

In some applications the tachometer need have only one control output terminal and a single AND gating circuit connected to a predetermined stage of the register will be necessary. In general, however, a plurality of such gating circuits will be found advantageous.

Figure 2:
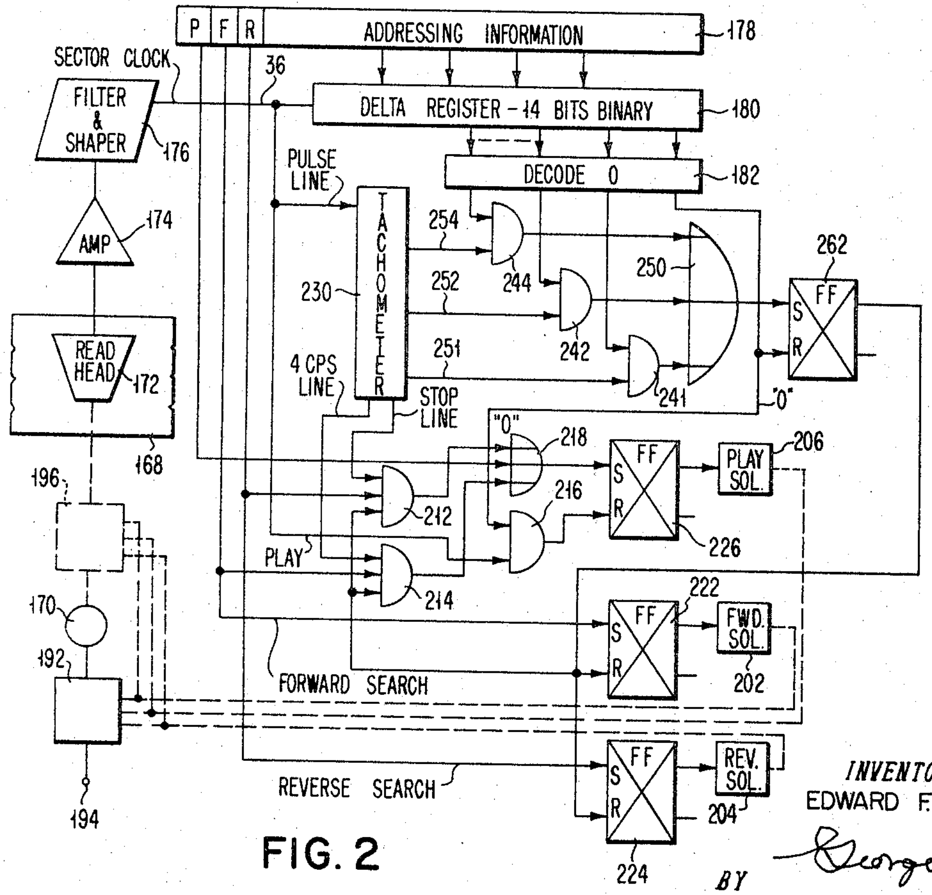

In order that the numerous advantages of the invention may obtain in practice, a preferred embodiment thereof, given by way of example only, is described hereinafter with reference to the accompanying drawing, forming a part of the specification, and in which:

FIG. 1 is a functional diagram of an exemplary embodiment of closed-loop servosystems incorporating switched feedback networks according to the invention; and FIG. 2 is a functional diagram of a magnetic tape accessing servosystem incorporating the invention.

In FIG. 1 a device 8 to be incremented a number of steps is mechanically coupled to a motor 10. Insofar as the principles of the invention are concerned the incrementing of the motor 10 itself can be considered as the driven device in many applications. Motor control logical circuitry 12 and drive control logic circuitry 13 shown here as electronic latches 14 and 16 and gating circuits 18 and 19 cooperate in the control of the motor 10. A counter 20 is coupled to the latch 16 to reset the latter when the counter 20 indicates a count of zero. The counter 20 can be one of several known in the art into which a number equal to the number of increments through which the motor 10 is to be moved is loaded by conventional means not shown here. The output lines of a pair of AND gates 22 and 24 are applied to the counter 20 to decrement the same as pulses appear at the output of either of the gating circuits. A commutator 26 is coupled to the motor 10 producing a train of pulses in synchronism with the incrementing of the motor 10 which are applied to the first AND gate 22 and to a substantially fixed rate pulse generator 28 for synchronizing the latter. The fixed pulse rate generator 28 is coupled to the second AND circuit 24, the output line of which is connected to the input terminal of an electronic tachometer 30. One output terminal 32 of the tachometer 30 produces a potential level at a pulse rate substantially equal to the pulse rate of the generator 28 so that the AND gating circuit 24 passes pulses of that fixed rate to the counter 20 and to the tachometer 30 as well as the motor control logic circuit 14 as required. The generator 28 is preferably arranged to generate a pulse train substantially equal to the maximum pulse rate at which the motor 10 is capable of moving in its fundamental mode. The pulse rate of 200 cycles per second is conventional for example, with many commercially available stepping motors. An inverter circuit 34 is coupled between the tachometer output terminal 32 and the gating circuit 22 in order to block the output pulse train of the commutator 26 when the rate is between zero and up to a rate substantially equal to that of the generator 28. A number of AND circuits 41, 42, 44 and 48 are individually coupled to output terminals 51, 52, 54 and 58 of the tachometer 30 and to the lower order stages of the counter 20 in descending order as indicated in the diagram. The output lines of the AND circuits are connected together effecting an OR gating circuit, commonly called a Dot OR, or DOR, circuit in the vernacular, and connected to the set terminal of the braking latch 16.

In operation a cycle begins with the counter 20 at zero, the control element latches 14 and 16 reset, and the low speed terminal 32 of the tachometer 30 up at the higher, or active, level of the two possible levels. All other terminals of the tachometer 30 are down to the lower, or inactive, levels. By conventional means (not shown) the counter 20 is loaded with a number proportional to the number of increments over which it is desired that the motor 10 move the driven element 8. The driving latch set terminal 62 is energized to latch the driving latch 14 up enabling the motor circuit logic circuitry 12 to start the driving phase of the cycle. Under control of the logic circuitry 12 the motor 10 is pulsed at a rate determined by the fixed-rate generator 28. The commutator 26 synchronizes the generator 28. The counter 20, which is serving as a difference address, or delta, register is being decremented one count per pulse on the pulse line as the motor is incremented one increment per pulse. After a few increments the tachometer 30 will indicate a rate substantially equal to the maximum speed at which the motor 10 is reliably incremented in the prior art arrangements and the level at the low speed terminal 32 falls, passing control of the system to the commutator clock 26. The system is arranged such that the faster the motor 10 turns the faster the clock rate from the commutator 26. This provides a constant acceleration and a subsequent increase in speed which is clocked by the tachometer 30. The speed of the motor 10 will approach a maximum speed at which it will operate until a change in the opposite direction is indicated.

Position overshoot is not permitted, therefore, the motor must slow down to the rate controlled by the generator 28 before the final position increment is reached. The time and distance required to stop at any speed for a given application is predictable, therefore, as the motor speed increases, the tachometer 30 raises terminals 51, 52, 54 and 58 in that order, that is farther from the zero end of the counter 20. As the incrementing progresses, the number in the counter will approach the first stage at which the one AND gating circuit of the group (51–58) enabled by the tachometer 30 will be up. For example, the speed of the motor 10 may be such that gate 44 is enabled by the tachometer 30 over the line from the terminal 54 as the count approaches the number 5. When the number 5 is reached, the output line of the AND gating circuit 44 is raised and the braking latch 16 is set, the motor control logic circuitry 12 is arranged in accordance with the characteristics of the motor 10 to slow the latter down on raising of the latch 16. Slowing may be accomplished simply by letting the motor 10 coast, or braking energy may be actually applied to increase the rate of deceleration of the motor 10. Braking may be accomplished with some motors by actually applying reverse driving energy. An AND gating circuit 59 may be used in some applications to lock the motor when the two latches 14 and 16 are reset, depending on the characteristics of the particular motor.

To reiterate, at this time the feedback control line is switched into the control path to reset the running latch 14 and to set the braking latch 16. The motor now begins slowing down, although it is still moving in the same direction due to inertia. When the motor speed drops to the low maximum speed rate, the low speed terminal 32 of the tachometer 30 raises, transferring control back to the low speed generator 28. Because the generator 28 is synchronized by the commutator 26, the transfer is perfectly smooth. The low speed terminal 32 level rests the braking latch 16 and sets the driving latch 14 to continue the forward motion at the lower rate. When the counter 20 reaches zero, both control latches 14, 16 are reset and the motor is stopped in the desired position. The motor is then held in position under the control of the motor control logic circuitry 12 which is arranged for the particular characteristics of the motor 10 under consideration.

In many applications, only one AND gating circuit 40 will be necessary, but in other applications, especially where the number of increments is quite large, more than one ANDing circuit will be found helpful in optimizing the performance. The additional ANDing circuits and level detectors in the tachometer 30 are quite inexpensive.

While the foregoing description has been limited in the interest of clarity to the operation of the motor 10 in one direction, it should be clearly understood that those skilled in the art will readily effect further control circuitry operating the motor in both forward and reverse directions.

FIG. 2 shows an application of the switched feedback control technique in a system for controlling prerecorded magnetic tape at very high speeds. Conventional magnetic tatpe 168, of which a symbolic length only is shown, is moved by a motor 170 past an electromagnetic transducer 172 for producing a pulse output from prerecorded sector marks. The detector clock pulse train thus generated is applied to an amplifier 174 and regenerated in a shaper and/or filter circuit 176 the output of which is connected to the pulse line 36. Addressing information is available from a source 178 for loading into a delta register 180 to which a decoding circuit 182 is coupled.

The magnetic tape 168 may be driven in any number of ways known to the art and controlled according to the invention. Electric motor control logic 192 is connected to a source of electric power at terminal 194 and may drive one or more motors 170 through mechanical coupling means 196. In the example shown, the electric motor control logic and the mechanical coupling means 196 are operated in response to the operation of forward drive solenoid 202, a reverse drive solenoid 204 and a play drive solenoid 206 which are mechanically coupled to one or the other or both of the electric motor control logic 192 and the mechanical coupling unit 196. For example, the motor 170 may be a variable speed motor responding to a change of applied potential brought about by the operation of the solenoids and the mechanical coupling 196 may be a one-to-one or other ratio fixed gearing. Alternately, the motor 170 may be a stepping motor driving through a suitable drive 196 and the forward drive solenoid 202 and the reverse drive solenoid 204 where they merely throw switches in the electric motor control 192 which may be very much the same as the logic 72 in FIG. 2 of the above mentioned copending U.S. patent application. The play drive solenoid 206 may then be connected through the motor control logic 192 to drive the stepping motor 170 in the fundamental mode at a stepping rate something under 200 cycles per second. As another alternative the control logic 192 may comprise simple switching and the mechanical coupling means 196 may be a variable ratio drive mechanism, for example, plurality of variable speed belt drives as along the lines set forth in the copending U.S. patent application Ser. No. 564,190 hereinbefore mentioned. Other arrangements are sure to be suggested to those skilled in the art for this part of the arrangement which forms no part of the invention in and of itself.

Three AND gating circuits 213, 214 and 216 and an OR gating circuit 218 are arranged to drive three flip-flop circuits 222, 224 and 226 connected to the solenoids 202, 204 and 206 respectively. An electronic tachometer 230, is provided with output lines for enabling AND gating circuits 241, 242 and 244. The tachometer 230 is a known circuit arrangement. One such arrangement shown in the above mentioned copending U.S. patent application comprises an integrator to which the decrementing pulse train is applied preferably after amplification. The integrated voltage is sensed by a plurality of level detectors of known configuration and as the well known Schmitt trigger circuit. The output level of the low speed terminal is the inverse of that of the other detectors. The output lines of the AND gating circuits 241, 242 and 244 are coupled through an OR gating circuit 250 to a braking condition flip-flop 262 completing the circuit arrangement. In many cases a dot OR connection will serve as well depending on the degree of isolation required.

The operation, although different from that previously described, for the previous arrangement, is based on the register/tachometer feedback control of the invention. A delta register 180 is loaded with the number of magnetic tape sectors to be accessed. Each sector mark is associated with an absolute address recorded on the tape. This address must be read after each high speed access and may be read only at playback speed in the forward direction. Therefore, during a forward search the tape must be slowed to playback speed, corresponding to a clock rate of about 4 cycles per second, such that upon reaching a zero count the tape address may be read. However, during a reverse search, the tape must be slowed to a stop upon reaching a zero count and then automatically switched to the playback mode for reading the tape address. The pulse line 36 is coupled to the electromagnetic transducer 172 for applying pulses to the delta register 180 and the tachometer 230. The clock rate on the pulse line 36 varies with the speed of the tape 168, and therefore, as the tape access speed increases, the clock rate increases. The feedback control is effectively switched out at this time, just as though a switch in the feedback loop of a closed loop servo-system had been opened. Thus the advantage of an open loop servosystem is had at high speed without loss of indication of the number of increments through which the tape is passing. The tachometer 230 successively opens gates farther from the zero end of the delta register 180. The delta register is decremented by the pulse line 36. When a match occurs between the delta register count and the tachometer speed gate 241 or 242 or 244, the feedback control is switched into the network to slow the tape to playback speed at the desired tape location. The tape is stopped by deenergizing the various control solenoids which control the tape drive. For example, the transport shown and described in the above mentioned copending U.S. patent application Ser. No. 564,190 may be controlled by the arrangement of the invention. The flip-flop circuits 222, 224 and 226 may be connected to search solenoids 141 and 142 and to lock solenoid 180 of that application with electric switching connections whereby the flip-flop 226 also energizes the solenoids 141 and 142 simultaneously since that arrangement is indicated in the belt-driven capstan drive of that application. Those skilled in the art will readily effect the necessary connections.

An embodiment of the invention is contemplated along the lines shown in FIG. 2 for slowing and stopping a magnetic tape from any tape speed between zero and two hundred inches per second.

While the invention has been shown and described particularly with reference to preferred embodiments thereof, and various alternates have been suggested, it should be clearly understood that those skilled in the art may effect still further changes without departing from the spirit and scope of the invention.

The invention claimed is:

1. An electronic high speed direct accessing arrangement for a strip record medium having indicia recorded thereon at least at predetermined intervals proportional to the increments to be accessed, comprising:

a multiple stage delta register into which is loaded a number proportional to the number of increments to be imparted to said medium, means for driving said strip record medium selectively at a low speed and at a high speed, means for controlling said driving means, a record reproducing device arranged adjacent said strip record medium for producing a train of pulses in response to the relative movement of said indicia and said reproducing device, an electronic tachometer having a pulse train input and a plurality of output terminals each capable of delivering an energy level indicative of a rate within the range of the tachometer, means for applying said train of pulses to said delta register for decrementing the contents thereof and to said tachometer for indicating current rate of incrementation of said medium, decelerating control logic circuitry coupled to said register and to said tachometer for deriving a control level and to said drive controlling means for decelerating the rate of incrementation of said medium in accordance with said level.

2. An electronic high speed direct accessing arrangement as disclosed in claim 1 and wherein:

said decelerating control logic circuitry comprises at least one AND gating circuit.

3. An electronic high speed direct accessing arrangement as disclosed in claim 1 and wherein:

said decelerating control logic circuitry comprises a plurality of AND gating circuits, and circuitry effecting an OR gating circuit intercoupling said AND gating circuits.

4. An electronic high speed direct accessing arrangement as disclosed in claim 3 and incorporating:

at least one latch having:

a set terminal coupled to said OR effecting circuitry, and a reset terminal effectively coupled to the final stage of said register.

5. An electronic high speed direct accessing arrangement as defined in claim 4 and wherein:

said medium comprises magnetic tape, and said reproducing device comprises an electromagnetic transducer.

6. An electronic high speed direct accessing arrangement as defined in claim 4 and wherein:

said driving means is also arranged for driving said medium at a high speed in a direction opposite to the direction in which said medium is driven at low speed.

7. An electronic high speed direct accessing arrangement for a strip record medium having indicia recorded thereon at least at predetermined intervals proportional to the increments to be accessed, comprising:

a multiple stage delta register into which is loaded a number of increments to be imparted to said medium,
means for driving said strip record medium selectively at a low speed and at a high speed in a given direction,
means for controlling said driving means,
a record reproducing device arranged adjacent said strip record medium producing a train of pulses in response to the relative movement of said indicia on said medium and said reproducing device,
an electronic tachometer having a pulse train input and a plurality of output terminals each capable of delivering an energy level indicative of a rate within the range of the tachometer,
means for applying said train of pulses to said delta register for decrementing the contents thereon and to said tachometer for indicating current rate of incrementation of said medium
a plurality of two-way AND gating circuits individually coupled to said register and to said tachometer for deriving a control level and having the outputs connected effectively in common,
at least one latch having:
a set terminal coupled to said common connection, and
a reset terminal effectively coupled to the final stage of said register for decelerating the rate of incrementation of said medium in accordance with said control level,
a search latch having set and reset terminals,
a play latch having set and reset terminals,
another AND gating circuit having input terminals connected to said tachometer, to said one latch and to a source of search command signal,
an OR gating circuit having the output connected to the set terminal of said play latch and having input terminals connected to a source of play command signal and to said other AND gating circuit, and
a further AND gating circuit having input terminals connected to said pulse applying means and to said final stage of said register and having the output connected to the reset terminal of said play latch.

8. An electronic high speed direct accessing arrangement for a strip record medium as disclosed in claim 7 and incorporating:

means coupled between said search and play latches and to said driving means for effecting the transporting of said medium in a desired speed.

9. An electronic high speed direct accessing arrangement for a strip record medium having indicia recorded thereon at least at predetermined intervals proportional to the increments to be accessed, comprising a multiple stage delta register into which is loaded a number proportional to the number of increments to be imparted to said medium, means for driving said strip record medium selectively at a low speed and at a high speed in a given direction and at a high speed in a direction opposite to said given direction,
means for controlling said driving means,
a record reproducing device arranged adjacent said strip record medium for producing a train of pulses in response to the relative movement of said indicia on said medium and said reproducing device,
an electronic tachometer having a pulse train input and a plurality of output terminals each capable of delivering an energy level indicative of a rate within the range of the tachometer,
means for applying said train of pulses to said delta register for decrementing the contents thereon aid to said tachometer for indicating current rate of incrementation of said medium
a plurality of two-way AND gating circuits individually coupled to said register and to said tachometer for deriving a control level and having the outputs connected effectively in common,
at least one latch having:
a set terminal coupled to said common connection, and
a reset terminal effectively coupled to the final stage of said register for decelerating the rate of incrementation of said medium in accordance with said control level,
forward and reverse search latches each having set and reset terminals,
a play latch having set and reset terminals,
another pair of AND gating circuits having input terminals connected to said tachometer, to said one latch and to sources of forward and reverse search command signal,
an OR gating circuit having the output connected to the set terminal of said play latch and having input terminals connected to a source of play command signal and to said other pair of AND gating circuits, and
a further AND gating circuit having input terminals connected to said pulse applying means and to said final stage of said register and having the output connected to the reset terminal of said play latch.

10. An electronic high speed direct accessing arrangement for a strip record medium as disclosed in claim 9 and incorporating:

means coupled between said search and play latches and to said driving means for effecting the transporting of said medium in a desired speed and direction.

References Cited

UNITED STATES PATENTS 3,099,781 7/1963 Herchenroeder.
3,219,895 11/1965 Price.

ORIS L. RADER, *Primary Examiner.*
K. L. CROSSON, *Assistant Examiner.*

U.S. Cl. X.R.

318—28, 448; 340—174.1